(12) United States Patent
Beyer et al.

(10) Patent No.: US 8,298,638 B2
(45) Date of Patent: Oct. 30, 2012

(54) BUBBLE STABILITY

(75) Inventors: Douglas E. Beyer, Midland, MI (US); Hyun K. Jeon, Midland, MI (US); Eric K. Lee, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 798 days.

(21) Appl. No.: 12/444,789

(22) PCT Filed: Oct. 17, 2007

(86) PCT No.: PCT/US2007/022128
§ 371 (c)(1),
(2), (4) Date: Apr. 8, 2009

(87) PCT Pub. No.: WO2008/051410
PCT Pub. Date: May 2, 2008

(65) Prior Publication Data
US 2010/0015375 A1   Jan. 21, 2010

Related U.S. Application Data

(60) Provisional application No. 60/854,391, filed on Oct. 25, 2006.

(51) Int. Cl.
*B29D 22/00* (2006.01)
*B29D 23/00* (2006.01)
*B32B 1/08* (2006.01)

(52) U.S. Cl. ............... 428/36.6; 428/35.7; 428/36.7; 428/36.5; 428/36.9; 428/36.91; 428/36.92; 526/343; 526/317.1; 264/464

(58) Field of Classification Search ............... 428/35.7, 428/36.6, 36.7, 36.5, 36.9, 36.91, 36.92; 526/343, 317.1; 264/464
See application file for complete search history.

(56) References Cited

U.S. PATENT DOCUMENTS

| | | | |
|---|---|---|---|
| 2,160,940 A | 6/1939 | Britton et al. |
| 2,968,651 A | 1/1961 | Friedrich et al. |
| 3,007,903 A | 11/1961 | Stark |
| 3,456,044 A | 7/1969 | Pahlke |
| 3,634,369 A | 1/1972 | Baumann |
| 3,642,743 A | 2/1972 | Schuetz et al. |
| 3,879,359 A | 4/1975 | Hinkamp et al. |
| 4,041,235 A | 8/1977 | Suzuki et al. |
| 4,242,484 A | 12/1980 | Suzuki et al. |
| 4,255,306 A | 3/1981 | Gibbs |
| 4,296,013 A | 10/1981 | Gibbs |
| 4,352,849 A | 10/1982 | Mueller |
| 4,820,557 A | 4/1989 | Warren |
| 4,865,902 A | 9/1989 | Golike et al. |
| 4,886,690 A | 12/1989 | Davis et al. |
| 4,927,708 A | 5/1990 | Herran et al. |
| 4,952,451 A | 8/1990 | Mueller |
| 4,963,419 A | 10/1990 | Lustig et al. |
| 5,674,607 A | 10/1997 | Schirmer |
| 6,627,679 B1 | 9/2003 | Kling |
| 6,713,105 B1 | 3/2004 | Bekele |
| 6,824,734 B2 | 11/2004 | Boggs et al. |

FOREIGN PATENT DOCUMENTS

| | | |
|---|---|---|
| EP | 0029316 A1 | 5/1981 |
| EP | 0 232 016 A2 | 8/1987 |
| JP | 59-215305 | 12/1984 |
| JP | 02 145613 | 6/1990 |

OTHER PUBLICATIONS

"Vinylidene Chloride Monomer and Polymers" from the Kirk-Othmer:Encylopedia of Chemical Technology, Fourth Edition, vol. 24, John Wiley & Sons, Inc., New York, 1997, pp. 882-923.
24 Kirk-Othmer Encyc. Chem. Tech. $3^{rd}$ Ed., Waxes, at 473-77 (J. Wiley & Sons 1980).
The Encyclopedia of Chemical Technology, Kirk-Othmer, Third Edition, John Wiley & Sons, New York, 1981, vol. 16, pp. 416-417 and vol. 18, pp. 191-192.
A.T. Widiger, R.L. Butler, in O.J. Sweeting, ed., The Science and Technology of Polymer Films, Wiley Interscience, New York, (1971).
Kirk-Othmer: Encyclopedia of Chemical Technology, Fourth Edition, vol. 24, New York, John Wiley & Sons Inc. 1997, pp. 912-913.
E.D. Serdynsky, in H.F. Mark, S.M. Atlas and E. Cernia (eds.), *Man-Made Fibers*, vol. III, Interscience, N.Y., p. 303, (1968).
L.I. Nass, ed., *Encyclopedia of PVC*, vol. III, Marcel Dekker, p. 1295, (1977).

*Primary Examiner* — Michael C Miggins
(74) *Attorney, Agent, or Firm* — Stephen T. Falk

(57) ABSTRACT

The invention includes a copolymer of vinylidene chloride with at least one monounsaturated comonomer and at least one branching monomer in an amount sufficient to increase molecular weight over that of a polymer prepared using the same process and same monomers in the same relative amounts except without the branching monomer, but preferably the branching monomer is present in a quantity not sufficient to result in measurable crosslinking as determined by solubility in tetrahydrofuran at up to 83° C. The invention includes a process for making the polymer and processes for forming the copolymer or compositions thereof as well as articles comprising the copolymer and compositions thereof. The copolymer exhibits improved bubble stability and is particularly useful for processes in which the copolymer is at least partially oriented in formation such as blow molding, formation of monofilament fiber and film blowing.

16 Claims, No Drawings

BUBBLE STABILITY

This application claims benefit of priority from U.S. Provisional Application Ser. No. 60/854,391, filed on Oct. 25, 2006.

BACKGROUND

This invention relates to an improved polymer composition and a film blowing process particularly suited for utilizing the polymer compositions. More particularly, this invention relates to the manufacture of films from such polymers as poly(vinylidene chloride), PVDC, Polymers, particularly vinylidene chloride polymers, are widely used in packaging. In myriad instances they are used in forms that require formation of a film from the polymer. The polymers are typically formed into various shapes, including films, while molten or semi-solid, in a state somewhat less crystalline or solid than the most crystalline or solid form of the polymer at room temperature. It is important to avoid holes and other discontinuities during the forming processes. The forming processes to which this invention is most applicable include those wherein a polymer mass or film is elongated, stretched or otherwise manipulated, especially manipulated to form a thinner part.

Among such processes, film blowing processes, especially double bubble processes, are especially sensitive to formation of discontinuities because the blown bubbles necessary in the process fail, that is they break, become irregular in thickness, adopt irregular shapes, collapse or the like, all of which lead to eventual breaks, collapse or to discontinuation of the blowing process if the irregularity is noted before break or collapse. Efficient operation of a blowing process to produce a film of desirable uniformity in thickness requires that these discontinuities be avoided, that is, that the bubble remains stable during the blowing process. While the present invention addresses avoidance of discontinuities in other processes or other stages of processing, the effect will be referred to as "bubble stability" herein because sensitive tests on film-making bubbles can demonstrate the effect of the invention.

Bubble stability in other polymers such polymers as ethylene/vinyl acetate, has been improved by light crosslinking or coupling such as that taught in U.S. Pat. Nos. 4,515,745 and 6,506,848. However, these methods have eluded application to such polymers as vinylidene chloride polymers. It would be desirable to improve the bubble stability of polymers, especially vinylidene chloride polymers, by coupling or branching.

Branching to improve bubble stability is particularly applicable to formation of monolayer films because layers of polymers other than polyvinylidene chloride can compensate for tendencies to form discontinuities in a polyvinylidene chloride layer. Thus, there is a need for monolayer structures, particularly monolayer films and structures including packaging such as sheets, lidstock, and containers, for example, pouches, tubes and bags, especially those useful in high temperature applications such as bags suitable for hot-fill or in which foodstuffs can be cooked either at the time of packaging or by the consumer, for example, immersion in hot water or exposure to steam. Such thermal processing often is referred to as cook-in or retort, and films used in such processes are known as cook-in or retort films.

SUMMARY OF THE INVENTION

The invention includes a copolymer of vinylidene chloride with at least one monounsaturated comonomer and at least one branching monomer in an amount sufficient to increase molecular weight over that of a polymer prepared using the same process and same monomers in the same relative amounts except without the branching monomer, but preferably the branching monomer is present in a quantity not sufficient to result in measurable crosslinking as determined by solubility in tetrahydrofuran at up to 83° C. The invention includes a process for making the polymer and processes for forming the copolymer or compositions thereof as well as articles comprising the copolymer and compositions thereof. The copolymer exhibits improved bubble stability and is particularly useful for processes in which the copolymer is at least partially oriented in formation such as blow molding, formation of monofilament fiber and film blowing.

The invention also includes a process comprising steps of (a) supplying vinylidene chloride monomer, (b) supplying at least one monounsaturated comonomer, (c) supplying at least one branching monomer; and (d) exposing the resulting combination to conditions that result in polymerization into a copolymer comprising the supplied monomers Additionally, the invention includes a process comprising steps of (a) supplying a polymer made from a composition comprising vinylidene chloride, at least one monounsaturated comonomer and at least one branching monomer; (b) extruding the composition through an annular die into a tube form; (c) quenching the extruded tube in a cold water bath (cold tank); and (d) collapsing the tube into a tape form.

Additionally the invention includes articles made from a copolymer, composition or film according to the practice of the invention.

BRIEF DESCRIPTION OF THE DRAWINGS

Not applicable

DETAILED DESCRIPTION OF THE INVENTION

Definitions

The following terms are used herein as defined below to aid in describing the invention and in the claims.

"Molecular weight" is the weight average molecular weight in Daltons. It is measured by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° C. for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 μm Styrene/divinylbenzene copolymer beads commercially available from Polymer Laboratories under the trade designation PLGel 5μ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (~3,000,000 to 2000 Mp)) in conjunction with their elution volumes.

The term "crystallization" as used herein means the rearrangement of a portion of polymer molecules into more organized, denser structures commonly called crystallites, as measured by the described crystallization temperature test. Polymer crystallization normally occurs during the bubble blowing operation of monolayer film processes.

"Film" refers to a sheet, non-woven or woven web or the like or combinations thereof, having length and breadth dimensions and having two major surfaces with a thickness therebetween. A film can be a monolayer film (having only one layer) or a multilayer film (having two or more layers). A film, in most instances, has a thickness of up to about 20 mils ($5 \times 10^{-4}$ m).

"Layer" means herein a member or component forming all or a fraction of the thickness of a structure wherein the component is preferably substantially coextensive with the structure and has a substantially uniform composition.

The term "monolayer film" as used herein means a film having substantially one layer. Optionally, however, more than one ply of monolayer film is used in an application with or without one or more adhesives between adjacent plies. Thus, a film is considered monolayer if it is formed in a process considered in the art to be a monolayer process, for instance, formed by a double bubble process rather than a coextrusion process, even if two layers of a composition according to the practice of the invention are used adjacent to one another or even with an adhesive between the layers. When adhesive is used, each occurrence commonly has a thickness of at most about 10 percent, preferably at most about 5 percent of the total thickness of the structure of which it is a part. For purposes of this invention, a film that is monolayer when produced is considered monolayer even when it is used in packaging that may involve adjacency, adherence, or both to other materials.

The term "multilayer film" means a film having two or more layers. A multilayer film is composed of more than one layer preferably composed of at least two different compositions, advantageously extending substantially the length and breadth dimensions of the film. Layers of a multilayer film are usually bonded together by one or more of the following methods: coextrusion, lamination, extrusion coating, vapor deposition coating, solvent coating, emulsion coating, or suspension coating. A film, in most instances, has a thickness of up to about 20 mils ($5 \times 10^{-4}$ m).

"Laminate" refers to a material made up of two or more layers of material, including a multilayer film.

"Extrusion," and "extrude," refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

"Coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in film blowing, casting film, and extrusion coating processes.

"Blown film" or "film blowing" refers to a process for making a film in which a thermoplastic polymer or co-polymer is extruded to form a bubble filled with heated air or another hot gas in order to stretch the polymer. Then, the bubble is collapsed and collected in flat film form.

"Oriented" or "stretch-oriented" refers to a polymer-containing material which has been stretched at an elevated temperature (the orientation temperature), followed by being "set" in the stretched configuration by cooling the material while substantially retaining the stretched dimensions. A material can be stretched in one direction (uniaxial orientation), two directions (biaxial orientation), or multiple directions. Biaxial orientation typically occurs in two directions which are perpendicular to one another, such as the longitudinal direction and the transverse direction.

"Machine direction" refers to the length of a film in the direction in which it is produced, as opposed to "cross direction" which refers to the width of a film in a direction generally perpendicular to the machine direction.

"Cross direction" refers to the width of a film in a direction generally perpendicular to the direction in which it is produced, as opposed to "machine direction" which refers to the length of a film in the direction in which it is produced.

"Draw ratio" refers to an amount of stretching and is, more specifically, a ratio of a drawn or stretched length to an original length. For purposes of this invention, the term "draw" is not necessarily equated with molecular orientation.

"Seal" (noun) means a bond of a first region of a film surface or component surface to a second region of a film surface or component surface (or opposing surfaces).

"Heat-seal" (also known as a "heat-weld") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

"Barrier" means (a film or layer with) a lower permeance toward one or more gases (for instance, oxygen, water vapor, odor, preferably oxygen) than other layers in a multilayer structure. A "barrier resin" or "barrier polymer" means a polymer or polymer composition suitable for use in forming a barrier.

The term "sausage casing" as used herein means any film, wrap or tubing which surrounds a mass of edible matter as illustrated by a sausage, preferably in a generally cylindrical shape.

"Cook" means to heat a food product thereby effecting a change in one or more of the physical or chemical properties thereof (for example, color, texture, and taste).

"Cook-in" as used herein is intended to refer to packaging structurally capable of withstanding exposure to cook-in time-temperature conditions while containing a food product. Cook-in packaged foods are essentially pre-packaged, pre-cooked foods that go directly to the consumer in a configuration to be consumed with or without warming. Cook-in time-temperature conditions typically refer to a long slow cook, for example submersion in water of at least about 70° C. and preferably up to about 80° C. for at least about 4 hours, preferably up at least about 6 hours, more preferably up to about 12 hours. Such cook-in time-temperature requirements are representative of institutional cooking requirements. Under such conditions, a cook-in packaging advantageously maintains seal integrity and is delamination resistant.

"Hot-fill" refers to processes wherein hot materials are packaged. For instance, hot foods may be packaged in bags. The hot materials are commonly at temperatures of at least about 65° C., preferably at least about 85° C. Hot fill processes in most instances involve cooling immediately after contact with the hot materials or foods.

"Retorting" refers to exposure to temperatures of at least about 100° C., preferably at least about 121° C.; for a period of time sufficient to cook, pasteurize, sterilize or otherwise heat treat material.

"Elevated temperature" or "high temperatures" to which a structure of the invention may be exposed are those encountered in hot-fill, cook-in applications or retorting.

"Polymer" means the polymerization product of one or more monomers and is inclusive of homopolymers as well as interpolymers, copolymers, terpolymers, tetrapolymers, and the like and blends and modifications of any of the foregoing, including block, graft, addition or condensation forms of polymers.

"Mer unit" means that portion of a polymer derived from a single reactant molecule; for example, a mer unit from ethylene has the general formula —$CH_2CH_2$—.

"Homopolymer" means a polymer consisting essentially of a single type of repeating mer unit.

"Interpolymer" or "Copolymer" refers to a polymer that includes mer units derived from at least two reactants (normally monomers) and is inclusive of random, block, segmented, graft, and the like copolymers, as well as terpolymers, tetrapolymers, and trimers and oligomers. In this invention, the terms copolymer and interpolymer are used for polymers believed to be random copolymers unless stated otherwise.

"Thermoplastic" describes a material that softens when exposed to heat and which substantially returns to a nonsoftened condition when cooled to room temperature. The term as used herein, refers to polymers, both crystalline and noncrystalline, which are melt processable under ordinary melt processing conditions and does not include polymers such as polytetrafluoroethylene which under extreme conditions, may be thermoplastic and melt processable.

"(Meth)acrylic acid" means acrylic acid, methacrylic acid or a combination thereof.

"(Meth)acrylate" means acrylate, methacrylate or a combination thereof.

As used herein, the term "PVDC" designates polyvinylidene chloride copolymers. Typical PVDC copolymers include vinylidene chloride/vinyl chloride copolymer, vinylidene chloride/methyl acrylate copolymer, and vinylidene chloride/acrylonitrile copolymer.

"Processing aid" means a substance or material incorporated in a film or film layer to increase the flexibility, workability, or extrudability of the film. These substances include both monomeric plasticizers and polymeric plasticizers and are generally those materials, which function by reducing the normal inter-molecular forces in a resin thus permitting the macromolecules to slide over one another more freely. The art refers to many plasticizers as stabilizers. Thus, the terms, "plasticizer" and "stabilizer" are intended to be used interchangeably herein.

The term "toughness" as used herein refers to the energy required to break a sample of film during a standard tensile test as measured by the procedures of ASTM D-882.

The term "tear resistance" as used herein refers to the force needed to propagate the tear of a notched film sample also known as Elmendorf tear as measured by the procedures of ASTM D-1922.

The term "dart drop impact strength" as used herein refers to the resistance to breaking by a dropped dart and is measured by the procedures of ASTM D-1709.

The term "bubble stability" as used herein refers to the ability of a bubble blown in a film forming process to resist failure, particularly breaking, during the film forming process. Bubble stability can be measured on any film blowing equipment, commercial or experimental by comparing the number of bubble breaks observed in processing a given quantity of material. Relative bubble stability of two or more compositions can be observed in this manner using the same quantity of material for each composition and either using the same conditions for each or conditions that result in the same effect, such as conditions that allow a given quantity of each composition to be processed in a given time. It is, however, desirable to compare bubble stability among compositions on smaller quantities of material than might produce reproducible comparative results under commercial conditions. One method to accomplish this result is to add a known quantity of stress concentrators of known sizes to equal quantities of polymer composition being compared. In the measurements herein the added stress concentrators are uniformly sized glass beads with a range of sizes from 38 micron to 594 micron commercially available from Potters Industries under the trade designation Spacer Beads. These uniformly sized glass beads are added, one size at a time, at the level of 0.002 weight percent to each quantity of polymer composition to produce a "doped material" which is then extruded into monolayer film using the same double bubble blown film process in each instance. A series of doped materials is blown into films. The size of the glass bead that is needed to result in bubble break in the extrusion of 15 lbs (6.8 kg) of the doped material is observed and recorded. The frequency of the bubble breaks during the extrusion of the sample of doped material is also recorded. The larger the glass bead size needed to cause bubble break, the higher is the resistance to bubble break from stress concentrators. Also, when the same size of glass bead is needed to cause bubble breaks, the material that has a lower number of bubble breaks is more resistant to bubble breaks, that is, more stable.

The term "stress concentrator" is used herein to refer to any material or irregularity, for instance a small bubble, which increases the magnitude of tensile or shear stress in its vicinity in a polymer being blown into a film.

"Oxygen permeability" as used herein is the volume of oxygen that passes through a given cross sectional area (1 square meter) of film (or layer of a film) of a unit thickness (1 micron) made from the formulated resin. It is measured according to the procedures of ASTM D 3985 at 23° C. and 50 percent Relative Humidity (RH) with a unit of measurement of cubic centimeters-micron/square meter-24 hour-atmosphere.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "105" includes at least from 104.5 to 105.49. Furthermore, all lists are inclusive of combinations of any two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. For instance, a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

Vinylidene chloride polymers (also known as vinylidene chloride resins, interpolymers of vinylidene chloride, vinylidene chloride interpolymers, copolymers of vinylidene chloride, and PVDC) are well-known in the art. See, for example, U.S. Pat. Nos. 3,642,743 and 3,879,359. As used herein, the term "interpolymer of vinylidene chloride," vinylidene chloride interpolymer" or "PVDC" encompasses copolymers, terpolymers, and higher polymers wherein the major component is vinylidene chloride, optionally and preferably having one or more mono-ethylenically unsaturated monomer (monounsaturated comonomer) copolymerizable with the vinylidene chloride monomer such as vinyl chloride, alkyl acrylates, alkyl methacrylates, acrylic acid, methacrylic acid, itaconic acid, acrylonitrile, and methacrylonitrile. In the practice of the invention, the PVDC also includes at least one branching monomer. A polymer made from vinylidene chloride, at least one monounsaturated comonomer and at least one branching monomer is referred to herein as a "branched vinylidene chloride polymer."

The term "branching monomer" is used herein to designate any monomer having more than one carbon to carbon double bond that is copolymerizable with vinylidene chloride. The branching monomer has at least 2 such double bonds, and preferably at most 4, more preferably at most 3, most preferably 2 such double bonds. Preferable branching monomers include di(meth)acrylates, that is esters of acrylic or methacrylic acid with diols, tri(methacrylates), di- and tri-allyl monomers, such as the esters of di- or tri-carboxylic acids with allyl substituted alcohols, allyl(meth)acrylates, allyl acrylate divinyl benzene, ethylene diacrylate and the like and combinations thereof; alkylene diacrylates like ethylene diacrylate, di- and tri-acrylates and combinations thereof are preferred; di- and tri-acrylates and combinations thereof more preferred; and diacrylates and combinations thereof most preferred. Acrylates are preferred because their reactivity is similar to vinylidene chloride as compared to methacrylates which incorporate preferentially and allyl compounds which incorporate slower. Di- and tri-methacrylates are observed to lead to crosslinking at lower concentrations than di or tri-acrylates. Diacrylates include the acrylic acid diesters of such alcohols as 1,6-hexanediol, 1,4 butanediol, 1,3 butanediol, ethylene glycol, diethylene glycol, triethylene glycol and the like and combinations thereof. Triacrylates include the acrylic acid triesters of such alcohols as 1,1,1 trimethylolpropane, glycerol and the like and combinations thereof.

In one embodiment this invention is particularly applicable to alkyl acrylate vinylidene chloride polymers (acrylate PVDC). The vinylidene chloride polymer has monomer units from vinylidene chloride and at least one alkyl acrylate. Such alkyl acrylates include alkyl acrylates having alkyl groups of from 1 to 5 carbon atoms and combinations thereof, preferably methyl acrylate, ethyl acrylate, or butyl acrylate, or combinations thereof, more preferably methyl or butyl acrylate, or combinations thereof, more preferably in one embodiment, butyl acrylate, or combinations therewith, and more preferably in another embodiment, methyl acrylate or combinations therewith. In one embodiment, butyl acrylate is preferred because it results in more rapid crystallization (lower temperature) of copolymers with vinylidene chloride and because of toughness (durability) and the improved performance of films of these copolymers when exposed to retort conditions. In another embodiment, methyl acrylate is preferred because methyl acrylate results in lower permeability at comparable mole percent alkyl acrylate. In a third embodiment, ethyl acrylate is preferred because it provides a balance between toughness and barrier or permeability. In an alternative embodiment, the vinylidene chloride polymer optionally also has at least one additional monounsaturated comonomer polymerizable with vinylidene chloride and an alkyl acrylate, such as vinyl chloride, alkyl methacrylates, acrylic acid, methacrylic acid, itaconic acid, acrylonitrile, methacrylonitrile, and combinations thereof, preferably alkyl methacrylates, acrylic acid, methacrylic acid, itaconic acid, acrylonitrile, methacrylonitrile, or combinations thereof. In another embodiment, the invention is particularly useful in copolymers of vinylidene chloride and vinyl chloride.

Preferably, the vinylidene chloride interpolymer is formed from a monomer mixture comprising a vinylidene chloride monomer advantageously in an amount of at least 50, more advantageously at least about 75, preferably at least about 84, more preferably at least about 90 mole percent of the monomers in a polymer. More specifically, the preferred amounts of vinylidene chloride are the remainder when the preferred amounts of monounsaturated comonomer are present. In general, the monounsaturated comonomer is advantageously used in an amount of at least about 1.1, preferably at least about 2.5, more preferably at least about 3.8, most preferably at least about 4.2 mole percent, and advantageously at most about 25, preferably at most about 16, more mole percent based on total vinylidene chloride interpolymer. When vinyl chloride is the monounsaturated comonomer, the amount is preferably at least about 5, more preferably at least about 6 mole percent, with the general preferred maximums. When an alkyl acrylate monounsaturated comonomer or combination thereof is used the advantageous and preferred minimum amounts are as previously stated, and the amount is advantageously at most about 16.6, preferably at most about 10, more preferably at most about 7.5, and most preferably at most about 6.5 mole percent, based on moles of monounsaturated monomers, including vinylidene chloride.

The branching monomer or combination thereof is sufficient to result in branching but not crosslinking as measured by insolubility in tetrahydrofuran (THF) at up to about 83° C. Such crosslinking would result in gels which are detrimental to film formation, especially blowing of polymer films. When extruded, a material that is branched, but not crosslinked, advantageously has a uniform melt and smooth surface. Mild crosslinking will result in a nonuniform melt and grainy or leathery surface. Heavy crosslinking will result in a gelled material that cannot be extruded. The amounts of branching monomer are preferably at least about 3, more preferably at least about 6, most preferably at least about 8 mole percent and preferably at most about 30, more preferably at most about 25, most preferably at most about 20 mole percent based on the mole weight of the base polymer (rather than moles of monounsaturated monomers). Those skilled in the art will recognize that these amounts are, in most instances, and advantageously less than about 0.49 weight percent, more advantageously less than about 0.45, preferably less than about 0.4, more preferably less than about 0.2, most preferably less than about 0.15 weight percent depending on the molecular weight of the branching agent and the number average molecular weight of the unbranched polymer. Weights of branching monomer corresponding to preferred mole percents are relatively low because of the relatively higher molecular weight of the polymer. Units on the branching monomer concentration are determined by dividing the moles of branching monomer by the moles of base polymer times 100. Number of moles of branching monomer is determined by dividing the weight of branching monomer used in the polymerization by the molecular weight of the branching monomer. Number of moles of base polymer is determined by dividing the total weight of monomer used in the polymerization by the number average molecular weight of a polymer that would be produced by a similar polymerization without branching monomer. Theoretically, the maximum branching monomer concentration that can be used without creating some degree of crosslinking is 25%. In practice, measurable or detrimental crosslinking may be avoided up to about 30 mole percent branching monomer.

Branching increases molecular weight over that of a polymer formed from the same monounsaturated comonomers in the same amounts reacted with the same amount of vinylidene chloride under the same process conditions for the same time. Practice of the invention is advantageously used to achieve an increase in molecular weight at least sufficient to increase melt viscosity, tensile elongation or toughness of the polymer, preferably at least about 5000, more preferably at least about 10,000 Dalton units. Preferably the increase in molecular weight is at least about 5, more preferably at least about 10, most preferably at least about 33 percent, and preferably at most about 75 percent before crosslinking is observed. While an increase in molecular weight could theoretically be achieved by continuing a polymerization reaction for a longer period, doing so is undesirable because longer periods of heat require more time and energy and result in less productivity from equipment. Furthermore, prolonged heating of a polyvinylidene chloride polymer often results in discoloration. Molecular weights of the branched vinylidene chloride polymer of the invention for use in making films are advantageously at least about 50,000, more advantageously at least about 60,000, preferably at least about 70,000, more preferably at least about 75,000, most preferably at least about 80,000 and at most about 500,000, more advantageously at most about 300,000, preferably at most about 250,000, more preferably at most about 225,000, most preferably at most about 200,000 based on weight average molecular weights measured by size exclusion chromatography using polystyrene calibration. The molecular weight distribution (defined as the weight average molecular weight divided by the number average molecular weight) of a vinylidene chloride/alkyl acrylate copolymer prepared in a batchwise suspension polymerization is typically about 1.9. Adding branching monomer adds a fraction of higher molecular weight resin to the distribution and thereby increases the molecular weight distribution, preferably to at least about 2, more preferably to at least about 2.1, most preferably to at least about 2.2.

The vinylidene chloride, optional one or more monounsaturated monomers, and at least one branching monomer or combinations thereof are combined by polymerization, preferably emulsion or suspension polymerization. The process includes at least a step of (a) contacting a composition comprising at least one vinylidene chloride and at least one alkyl acrylate and (b) exposing them to conditions effective for polymerization thereof. The polymerization is within the skill in the art such as taught by U.S. Pat. No. 2,968,651, U.S. Pat. No. 3,007,903, U.S. Pat. No. 3,879,359, U.S. Pat. No. 6,627,679 and "Vinylidene Chloride Monomer and Polymers" from the *Kirk-Othmer: Encyclopedia of Chemical Technology*, Fourth Edition, Vol. 24, John Wiley & Sons, Inc., New York, 1997, pp 882-923. except that specific monomers and monomer compositions necessary to achieve the desired polymer compositions are used along with and specific selections of polymerization conditions including; time, temperature, initiators to achieve the desired molecular weights. The process is optionally batch or continuous, preferably batch, and with or without continuous or stepwise addition of monomers, branching monomer, or a combination thereof. Continuous addition of branching monomer is preferred where the branching monomer contains a preferentially incorporating monomer functionality, that is a functionality that incorporates more rapidly with vinylidene chloride than does the unsaturated comonomer or combination of comonomers used, for example; 1,6 hexanediol dimethacrylate or divinyl benzene. Batchwise addition of the branching monomer at the beginning of the polymerization is preferred where the branching monomer contains a monomer functionality that does not incorporate preferentially, for example; 1,6 hexanediol diacrylate. A free radical initiator is usually used. Examples include peresters, such as t-butyl peroxy-2-ethylhexanoate; diacyl peroxides, such as benzoyl or lauroyl peroxide; peroxidicarbonates such as diisopropylperoxydicarbonate; and azo compounds.

Compositions containing at least one vinylidene chloride copolymers of the invention also optionally contain at least one plasticizer. Such plasticizers include epoxidized oils such as epoxidized soybean oil or epoxidized linseed oil; dibutyl sebacate; acetyl tributyl citrate; other polymeric or high molecular weight ester oils, advantageously having a molecular weight of at least about 300; and combinations thereof, preferably epoxidized oils and aliphatic esters and combinations thereof, more preferably epoxidized soybean oil, epoxidized linseed oil, dibutyl sebacate, acetyl tributyl citrate and combinations thereof.

In one embodiment, a combination of plasticizers is advantageously used. The combination preferably includes at least one plasticizer that has at least one epoxy group (hereinafter epoxy plasticizer) and at least one plasticizer that contains at least one ester functionality (hereinafter ester plasticizer). The epoxy plasticizers include epoxidized soybean oil, epoxidized linseed oil, epoxidized sunflower oil, epoxidized vegetable oils, and other epoxidized triglycerides and combinations thereof, preferably epoxidized vegetable oils, epoxidized linseed oil, epoxidized soybean oil and combinations thereof, more preferably epoxidized soybean oil. The ester plasticizers include dibutyl sebacate, acetyl tributyl citrate, other citrate esters, other polymeric or high molecular weight ester oils, advantageously having a molecular weight of at least about 300, and combinations thereof, preferably dibutyl sebacate, acetyl tributyl citrate and combinations thereof, more preferably dibutyl sebacate. Combinations are advantageous because the epoxy plasticizer provides protection against thermal degradation of the vinylidene chloride polymer, while the ester plasticizer is more effective in plasticization and, thus, reduces the total weight percentage of plasticizer needed to achieve a predetermined level of plasticization as compared with an epoxy plasticizer alone.

A variety of other additives within the skill in the art are optionally incorporated into the branched vinylidene chloride polymer of the invention. Additive type and amount will depend upon several factors. One such factor is the intended use of the composition. A second factor is tolerance of the composition for the additives. That is, amount of additive that can be added before physical properties of the blends are adversely affected to an unacceptable level. Other factors are apparent to those skilled in the art of polymer formulation and compounding.

Exemplary additives include plasticizers, heat stabilizers, pigments, processing aids, lubricants, fillers, and antioxidants. Each of these additives is within the skill in the art and several types of each are commercially available. Preferably, the vinylidene chloride polymer composition contains only additives commonly used such as the listed types.

Exemplary lubricants include fatty acids, such as stearic acid; esters, such as fatty esters, wax esters, glycol esters, and fatty alcohol esters; fatty alcohols, such as n-stearyl alcohol; fatty amides, such as N,N'-ethylene bis stearamide; metallic salt of fatty acids, such as calcium stearate, and magnesium stearate; and polyolefin waxes, such as paraffinic, and oxidized polyethylene. Paraffin and polyethylene waxes and their properties and synthesis are described in 24 Kirk-Othmer Encyc. Chem. Tech. 3rd Ed., Waxes, at 473-77 (J. Wiley & Sons 1980), which is incorporated herein by reference.

Additives, including the stabilizing composition according to the practice of the invention, are conveniently incorporated into the branched vinylidene chloride polymer or vinylidene chloride interpolymer composition using any mixing process that does not have substantial adverse effects on the branched vinylidene chloride polymer or additives, preferably dry blending techniques, alternatively melt blending or other means within the skill in the art. While the stabilizing composition has been spoken of as being admixed with the branched vinylidene chloride polymer, it is within the practice of the invention to incorporate the components of the stabilizing composition into some or all of one or more components of the branched vinylidene chloride polymer and other additives in any sequence. Preferred methods of combining components include in-situ mixing of additives into the polymerization train during the polymerization or finishing steps of the branched vinylidene chloride interpolymer, dry blending of the finished branched vinylidene polymer with the additives in a post reaction operation with blenders of various configuration and mixing intensity, melt blending or cofeeding additives and the branched vinylidene interpolymer directly to an extruder and the like and combinations thereof.

Similarly, compositions according to the practice of the present invention optionally contain other polymers within the skill in the art. Polymer type and amount will depend upon several factors. One such factor is the intended use of the composition. A second factor is compatibility of the polymers, that is, whether the polymers can form a sufficiently homogeneous mixture that does not separate undesirably for the intended purpose. Other factors are apparent to those skilled in the art. In one embodiment, the compositions contain at least two vinylidene chloride polymers according to the practice of the invention. In another embodiment, the compositions contain at least one vinylidene chloride polymer according to the practice of the invention and at least one vinylidene chloride polymer different from those taught herein such as at least one vinylidene chloride polymer that is not a branched vinylidene chloride polymer.

The branched vinylidene chloride polymer is advantageously used for any process wherein the polymer is oriented as processed, for instance blown film making, blow molding, injection blow molding, monofilament fiber formation and the like. The branched vinylidene chloride polymer is preferably used to make film by at least one film forming method within the skill in the art. Preferably the film forming method is a film blowing method, more preferably a monolayer blown film method.

A branched vinylidene chloride polymer of the invention advantageously are observed to increase bubble stability in a blown film process as compared to the use of a polymer formed with the same amounts of the same monomers except not using the branching monomer.

Simple blown bubble film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference.

The composition is most preferably blown using a monolayer blown film method commonly known to those skilled in the art as the double-bubble method. For instance, processes within the skill in the art for forming film include those disclosed in A. T. Widiger, R. L Butler, in O. J. Sweeting, ed., The Science and Technology of Polymer Films, Wiley Interscience, New York, (1971); Kirk-Othmer: Encyclopedia of Chemical Technology, Fourth Edition, Vol. 24, New York, John Wiley & Sons Inc. 1997, pp. 912-913 and references cited therein as well as those explained in detail in U.S. Pat. Nos. 6,824,734, and 5,674,607.

In one embodiment, the film blowing method preferably involves steps of (a) supplying a polymer made from a composition comprising vinylidene chloride, at least one monounsaturated comonomer and at least one branching monomer; (b) extruding the composition through an annular die into a tube form; (c) quenching the extruded tube in a cold water bath (cold tank); and (d) collapsing the tube into a tape form, preferably using a set of nip rolls, preferably at the bottom of the cold tank. In one embodiment, sizing of this tube and the width of the collapsed tape is provided by a volume of fluid (called the sock fluid) that is held inside this extruded tube by the set of nip rolls. The extruded tube with the sock fluid inside it before being collapsed by the cold tank nip rolls is the first bubble of the "double-bubble" process. The cold tank temperature is preferably chosen to optimize the crystallization nucleation of the poly(vinylidene chloride)

copolymer. The collapsed tape is reheated as it exits the cold water tank by passing through a warm water tank, to heat it to a temperature that is conducive for crystal nucleus growth during the subsequent bubble blowing step. Then a bubble of the composition is formed into a film by entrapping air to push open the collapsed tape exiting the warm tank. This expanded bubble of the final film is the second bubble of the double-bubble process. The film bubble is collapsed and wound onto at least one roll. In a preferred embodiment, the steps include step (a) and at least three of steps (b) through (i) of: (a) supplying a composition comprising at least one vinylidene chloride copolymer of the invention, (b) extruding the composition into a tube form, (c) quenching the extruded tube, (d) collapsing the tube into a tape form, (e) reheating the collapsed tape in a warm tank, (f) sizing the tube to attain a desired width of the collapsed tape using a volume of fluid held inside the extruded tube, (g) forming a bubble of the composition, (h) collapsing the film bubble, and (i) winding the resulting film onto at least one roll.

Advantageous conditions for a film blowing method include any temperature which is sufficient to allow a sufficient rate of inflation of the collapsed tape to form the bubble but insufficient to cause sticking of the edge of the tape to the nip rolls exiting the warm tank, any pressure which is sufficient to expand the bubble to the desired size but insufficient to cause bubble breaks by excessive expansion. Preferably, the warm tank temperature is at least about 5° C., more preferably at least about 10° C., most preferably at least about 20° C. The warm tank temperature is preferably at most about 80° C., more preferably at most about 60° C., most preferably at most about 40° C. Preferably, the cold tank temperature is at least about 5° C., more preferably at least about 7° C., most preferably at least about 10° C. The cold tank temperature is preferably at most about 50° C., more preferably at most about 35° C., most preferably at most about 20° C. In one preferred embodiment, the film, particularly a monolayer film, is useful to make at least one sausage casing, often referred to as a chub. A sausage casing utilizes such properties of the compositions according to the practice of the invention as film durability, barrier properties, shrink, and adhesiveness to contents of the casing. In one embodiment, the film shrinks when heated to fit tightly about the contents and adheres sufficiently to avoid bubbles that might lead to deterioration of the contents. Sausage casings of compositions different from those according to the practice of the invention often display at least one insufficiency in film durability, barrier properties, shrink, and adhesiveness to contents of the casing. Making sausage casings advantageously comprises (a) folding a strip of film, (b) sealing to form a side seam, (c) filling the resulting tube, and (d) cutting and closing at intervals. The strip is preferably continuous for lengths of at least about 750 m. The intervals are preferably regular. Formation of sausage casings is by any means within the skill in the art, for instance as taught by U.S. Pat. No. 6,713,105 B1 and European Patent 0029316 A1.

The resulting films of the present invention are useful as packaging and wrapping films and may be monolayer or multilayer films. In either embodiment, the PVDC layer or film optionally comprises advantageously at most about 50, preferably at most about 25, more preferably at most about 15, most preferably at most about 10 weight percent of at least one other polymer. The films of the present invention can be used alone or laminated to another film or a packaging film component thus forming a package, which contains a product. The films of the present invention are particularly useful for packaging. Oxygen barrier properties are important in film applications such as packaging primal cuts of meat (that is, large cuts of meat which are shipped to a specific store for further cutting for specific consumer consumption). As described by Davis et al. in U.S. Pat. No. 4,886,690, the oxygen barrier layer can also be designed as "peelable" to allow removal once the packaged primal cut arrives at the butcher/grocer; a peelable construction or design is particularly useful for "case-ready" vacuum skin packages of individual portions and eliminates the need for repackaging to an oxygen permeable package for blooming to bright red.

The thickness of the monolayer or multilayer film structures may vary. However, for both the monolayer and multilayer film structures described herein, the thickness is typically from about 0.1 mils (2.5 micrometers) to about 50 mils (1270 micrometers), preferable from about 0.4 mils (10 micrometers) to about 15 mils (381 micrometers), and especially from about 0.6 mils (15 micrometers) to about 4 mils (102 micrometers).

Fibers, preferably monofilament fibers of the branched vinylidene chloride polymer of the invention, are conveniently produced by methods within the skill in the art such as those disclosed in E. D. Serdynsky, in H. F. Mark, S. M. Atlas and E. Cernia (eds.), *Man-Made Fibers*, Vol. III, Interscience, N.Y., p. 303, (1968). Similarly blow molding of the of the branched vinylidene chloride polymer of the invention, is conveniently accomplished by methods within the skill in the art such as those disclosed in L. I. Nass, ed., *Encyclopedia of PVC*, Vol. III, Marcel Dekker, p. 1295, (1977).

More generally, the branched vinylidene chloride polymer is advantageously a formed into an article such as a fiber, a monofilament fiber, a molded object, a blow molded object, a film, a package, a foam, a container, a sheet, a laminate or combination thereof; preferably a film, package, sheet, sausage casing or combination thereof; more preferably package including wrap or casing or combination thereof; most preferably food packaging or combination thereof. The polymers and their compositions are advantageously formed into these articles by such processes as those previously discussed for films or other means within the skill in the art. Preferred processes advantageously include at least the steps of (a) supplying a composition comprising the polymer of the invention to a forming apparatus, and (b) blowing the composition preferably into a bubble. Advantageously, the process additionally includes at least one of the steps of (c) admixing the composition with at least one additive as discussed hereinafter, (d) heating the composition sufficiently to facilitate flow through the forming apparatus, or (e) allowing a formed article to cool after forming.

As sausage casings and in other embodiments of the invention, the film is often exposed to heat, for instance, in such uses as packaging, retort packaging, and hot fill packaging. Retort packaging is exposed to temperatures sufficient to at least partially cook the package contents at some point in the history of the package. Hot fill packaging is exposed to the heat of recently cooked, prepared or otherwise heated package contents, preferably food, at the time of filling the package. Often the package is in the form of a bag into which hot food is dropped. Then the package is sealed, often using heat, or radio frequency radiation. For such applications, the composition of the invention, especially when in the form of film advantageously withstands heat of at least about 35° C., preferably at least about 75° C., more preferably at least about 85° C., most preferably at least about 93° C. In most applications the highest heat encountered is advantageously at most about 155° C., preferably at most about 145° C., more preferably at most about 135° C., most preferably at most about 125° C. Such heat is advantageously withstood for periods of at least about 1 minute, preferably at least about 20 minutes, more preferably at least about 60 minutes, most preferably at least about 90 minutes. In most applications the heat is encountered for periods of at most about 240, preferably at most about 200, more preferably at most about 150, most preferably at most about 120 minutes. Whether such temperatures are withstood is measured by failure rate of a bag, tube or sausage casing being filled, usually with water, exposed to the temperature for a predetermined time. Failures which are defined as sausage casing breakage during retort as determined visually, unassisted are noted. While complete avoidance of failure is the goal, for purposes of the invention, a structure is considered to survive the stated heat exposure conditions if the structure of the invention exhibits a sausage casing breakage during retort per 10,000 retorted sausages of at most about 500, advantageously at most about 300, more advantageously at most about 200, most advantageously at most about 150, preferably at most about 100, more preferably at most about 50, most preferably at most about 20.

In the practice of the invention radio frequency sealing is advantageously used to prepare articles of the invention, preferably food packaging, more preferably sausage casings. Radio frequency sealing is within the skill in the art, such as disclosed by such references as Steve Myers, Radio Frequency Sealing for Disposable Medical Products, Medical Device and Diagnostic Industry Magazine, December, 1999, p. 32.

Compositions of the invention are formed into films, fibers, foams, sheets, containers, bottles, packages and the like and combinations thereof.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES GENERAL DESCRIPTION

In "Process A" 100 grams of a monomer mixture and 150 gm of water containing 1000 parts per million by weight based on monomer (ppm BOM) hydroxypropyl methyl cellulose and 500 ppm BOM tetrasodium pyrophosphate are placed into a 300 ml citrate bottle commercially available from Preiser Scientific. The bottle is capped. Then it is tumbled in a heated water bath until it reaches at temperature of 68.5° C. Polymerization is allowed to proceed for a polymerization time of 9.4 hours unless stated otherwise, increasing the temperature to 80° C. The resulting polymer is separated from the water and dried for 15 hours in a 70° C. oven.

In "Process B" polymer is produced in a suspension process using a 500-gallon (1893 l), glass lined reactor is loaded with 788 kg of a monomer mixture containing 95.2 parts vinylidene chloride, 4.8 parts methyl acrylate, 1 part epoxidized soybean oil, 0.25 parts t-butyl per-2-ethylhexanoate, 50 ppm 2,6 di-t-butyl-4-methyl phenol, the amount of branching monomer indicated in the examples, and 956 kg of a water mixture containing 1000 ppm BOM hydroxypropyl methyl cellulose and 508 ppm BOM tetrasodium pyrophosphate. The mixture is agitated using a twin pitched blade turbine agitator at 52 rpm (revolutions per minute) to form a suspension and heated to 68.5° C., which results in reaction that increases the temperature to 80° C. over a reaction period of 9.4 h to complete the polymerization. Unreacted monomer is then removed by applying vacuum. The resultant polymer is separated from the water using a basket centrifuge and air dried in a fluid bed drier at 75° C.

After either process, the molecular weight is determined by comparison with calibrated polystyrene using gel permeation chromatography.

Some polymers are tested for their ability to withstand bubble break brought on by stress concentrators during film blowing. The stress concentrators are uniformly sized glass beads commercially available from Potters Industries under the trade designation Spacer Beads. Beads ranging in size from 38 micron to 594 micron are used one size at a time, and in a series of experiments whereby the glass beads size is systematically increased, starting from the lowest to the highest. The beads are added in an amount equal to 0.002 weight percent of the weight of the formulation. The resulting material is then extruded into monolayer film using a "double bubble" blown film process described hereinafter.

The size of the glass bead that is needed to cause bubble break in the extrusion of 15 lbs (6.8 kg) of the material containing the beads is observed and recorded. The frequency of the bubble breaks during the extrusion of the 15 lb (6.8 kg) of material is also recorded. The larger the glass bead size needed to cause bubble break, the higher is the resistance to bubble break from stress concentrators. When, two materials have the same size of glass bead needed to cause bubble breaks, the material that has the lesser number of bubble breaks is more resistant to bubble breaks.

The vinylidene chloride resin is further formulated to give a blended resin suitable for monolayer film extrusion. This final formulated blend contains:

| | |
|---|---|
| vinylidene chloride resin | 93.12% |
| a 50/50 HDPE/high Mw silicone mixture commercially available from Dow Corning Corp. under the trade designation MB3 14 | 0.15% |
| a paraffin wax commercially available from Degussa Corp. under the trade designation Vestowax SH105 | 0.10% |
| an oxidized polyethylene wax commercially available from Honeywell International under the trade designation AC 629A | 0.10% |
| Stearamide | 0.11% |
| Ground limestone | 0.11% |
| Distearyl thiodipropionate | 0.23% |
| Erucamide | 0.08% |
| Epoxidized soybean oil commercially available from Ferro Corp. | 4.0% |
| Dibutyl sebacate | 2.0% |

These ingredients are blended in a high intensity mixer, where the solid additives are first added and allowed for thorough dispersion, followed by the addition of liquid plasticizers with thorough mixing. The blended resin is allowed to rest for a minimum of one day to allow the absorption of the liquid plasticizers into the resin, before extrusion of the blended resin.

Film extrusion is performed on a blown film extrusion line consisting of a 1.75 inch (44 mm) extruder, Model J007790, made by Egan Machinery and film blowing equipment, Model ME-SNIP-64-3HP-250, manufactured by Macro Engineering, Canada. The screw used is single flighted, with a 24 to 1 L/D (length to diameter) ratio and a 3:1 compression ratio. The extrusion line is equipped with a cold water quench tank, where the annular extrudate is quenched before being blown, followed by a warm water tank where the collapsed tape (flattened tube) is warmed. The warmed tube is then blown biaxially. The detailed film extrusion conditions are as follows:

| Extruder temperature and pressure profile: | |
|---|---|
| Feed Zone: 40° C. | |
| Zone 1: 165° C. | 3345 psi (23064 kPa) |
| Zone 2: 175° C. | 321 psi (2213 kPa) |
| Zone 3: 175° C. | 2117 psi (14597 kPa) |
| Adapter 175° C. | |
| Die: 165° C. | |

Extruder rpm: 25 rpm (0.4 r/s)
Extrusion rate: 25 lb/hr (0.003 kg/s), starve fed (that is the rate of feed is controlled by a feeder metering the solid feed into the hopper instead of by the rate of rotation of the extrusion screw)
Head Pressure: 2134 psi (14714 kPa)
Cold tank temperature: 10° C.)
Warm tank temperature: 26° C.)
Blow Up Ratio: 4.04 (measured by the ratio of lay flat width of the blown film to the lay flat width of the collapsed tape from which the film is blown).
Machine Direction Stretch Ratio: 3.46
Film thickness = 20 micron single wound Examples (Ex) 1-9 and Comparative Samples (CS) A, B and D Examples (EX) 1-9 and Comparative Samples (CS) A, B and D are prepared using Process A with the monomer mixtures indicated in Table 1, where "parts" indicates parts by weight per hundred parts by weight of the combined monomers. The monomer mixtures of the Examples also contain the amount of 1,6 hexanediol diacrylate indicated in Table 2, along with the molecular weight (Mw) of the resulting polymers.

TABLE 1

Monomer Mixtures

| | EX 1-4, CS A | EX 5-9, CS B | CS D |
|---|---|---|---|
| vinylidene chloride (parts) | 95.2 | 93 | 95.2 |
| butyl acrylate (parts) | | 7 | |
| methyl acrylate (parts) | 4.8 | | 4.8 |
| dibutyl sebacate (parts) | | 2 | |
| epoxidized soybean oil (parts) | 1 | 1 | 1 |
| t-butyl per-2-ethylhexanoate (parts) | 0.25 | 0.37 | 0.25 |
| 2,6 di-t-butyl-4-mehyl phenol (ppm) | 50 | 50 | 50 |
| Polymerization time (hours) | 9.4 | 9.4 | 14.5 |
| Polymerization temperature (° C.) | 68.5-80 | 71-83.5 | 62.5-74 |

TABLE 2

Correlation of Branching Monomer and Molecular Weight

| | Weight % 1,6 hexanediol diacrylate, 93% purity | Mole % 1,6 hexanediol diacrylate, 93% purity | Molecular Weight (Mw), [Mn] |
|---|---|---|---|
| CS A | 0 | 0 | 114,000, [59,000] |
| EX 1 | 0.025 | 6.1 | 132,000 |
| EX 2 | 0.05 | 12.2 | 157,000 |
| EX 3 | 0.075 | 18.4 | 188,000 |
| EX 4 | 0.1 | 24.5 | 198,000 |

TABLE 2-continued

Correlation of Branching Monomer and Molecular Weight

| | Weight % 1,6 hexanediol diacrylate, 93% purity | Mole % 1,6 hexanediol diacrylate, 93% purity | Molecular Weight (Mw), [Mn] |
|---|---|---|---|
| CS B | 0 | 0 | 80,000, [39,200] |
| EX 5 | 0.01 | 1.7 | 82,000 |
| EX 6 | 0.025 | 4.2 | 88,000 |
| EX 7 | 0.05 | 8.5 | 94,000 |
| EX 8 | 0.075 | 12.7 | 110,000 |
| EX 9 | 0.1 | 17.0 | 123,000 |
| CS D | 0 | 0 | 135,000 |

The data in Table 2 shows that increasing amounts of branching monomer, 1,6 hexanediol diacrylate increases the molecular weight of the polymer due to branching. Each of the polymers shown in Table 2 is completely soluble in tetrahydrofuran at 63° C.

Example 10 and Comparative Sample C

Example 10 and Comparative Sample C are prepared by Process B with 0.05 parts by weight (12.4 mole percent) of 1,6 hexanediol diacrylate, 93% purity used in Example 10, but not in CS C. The polymer of Example 10 has a molecular weight (Mw) of 157,000 while CS C has a Mw of 117,000. Each polymer is formulated and blown as described in the general process for testing of bubble stability. A 74 micron bead is required to break the bubble blown from CS C, while the bubble blown from Example 10 requires a 419 micron bead, showing it has much improved bubble stability.

Embodiments of the Invention Include the Following

1. A copolymer of vinylidene chloride with at least one monounsaturated comonomer and at least one branching monomer in an amount sufficient to increase molecular weight over that of a polymer prepared using the same process and same monomers in the same relative amounts except without the branching monomer, but preferably the branching monomer is present in a quantity not sufficient to result in measurable crosslinking as determined by solubility in tetrahydrofuran at up to 83° C.
2. A process comprising steps of (a) supplying vinylidene chloride monomer, (b) supplying at least one monounsaturated comonomer, (c) supplying at least one branching monomer; and (d) exposing the resulting combination to conditions that result in polymerization into a copolymer comprising the supplied monomers
3. A process comprising steps of (a) supplying a polymer made from a composition comprising vinylidene chloride, at least one monounsaturated comonomer and at least one branching monomer; (b) extruding the composition through an annular die into a tube form; (c) quenching the extruded tube in a cold water bath (cold tank); and (d) collapsing the tube into a tape form, preferably using a set of nip rolls, preferably at the bottom of the cold tank.
4. The copolymer or process of any of the preceding embodiments wherein the average monounsaturated comonomer content of the copolymer is from at least about any of 1.1, 2.5, 3.8, 4.2, 5 or 6 to at most about any of 6.5, 7.5, 10, 16, 16.6, or 25 mole %, preferably the monounsaturated comonomer is vinyl chloride, more preferably in an amount of from at from at least about any of 5 or 6 to at most about any of 16, 16.6, or 25 mole %; or preferably the monounsaturated comonomer is at least one alkyl acrylate, more preferably methyl, ethyl, or butyl acrylate or a combination thereof, most preferably methyl acrylate; each of the acrylates or a combination most preferably being present in an amount from at least about any of 1.1, 2.5, 3.8, 4.2 to at most about any of 6.5, 7.5, 10, or 16.6 mole %.
5. The copolymer or process of any of the preceding embodiments wherein the branching monomer is a molecule with at least two polymerizable monomer groups, preferably selected from 1,6 hexanediol dimethacrylate, allyl acrylate, divinyl benzene, 1,1,1 trimethylolpropane triacrylate, ethylene diacrylate, triethylene glycol diacrylate, 1,4 butanediol diacrylate, 1,6 hexanediol diacrylate, or combinations thereof, more preferably the branching monomer has at least two polymerizable acrylate groups, most preferably selected from 1,1,1 trimethylolpropane triacrylate, ethylene diacrylate, triethylene glycol diacrylate, 1,4 butanediol diacrylate, 1,6 hexanediol diacrylate or combinations thereof, alternatively, more preferably the branching monomer has two polymerizable acrylate groups, most preferably selected from ethylene diacrylate, triethylene glycol diacrylate, 1,4 butanediol diacrylate, 1,6 hexanediol diacrylate or combinations thereof.
6. The copolymer or process of any of the preceding embodiments wherein the branching monomer concentration is sufficient to result in, or results in, an increase in polymer molecular weight over that of a polymer formed under the same conditions from the same monomers except without the branching monomer, preferably where the increase is at least about any of 5, 10 or 33 and more preferably at most about 75 percent; or preferably, where the weight average molecular weight is at least about any of 50,000; 60,000; 70,000; 75,000; or 80,000; and more preferably to at most about any of 500,000; 300,000; 250,000; 225,000; or 200,000; or a combination thereof.
7. The copolymer or process of any of the preceding embodiments wherein the branching monomer concentration is from at least about any of 3, 6 or 8 mole % to at most about any of 30, 25 or 20 mole %, preferably the amount of branching monomer is less than about any of 0.49, 0.45, 0.4, 0.2 or 0.15 weight percent.
8. The copolymer or process of any of the preceding embodiments wherein the molecular weight distribution is greater than about any of 2.0, 2.1 or 2.2.
9. The copolymer or process of any of the preceding embodiments wherein the process a batch polymerization process, preferably with or, alternatively preferably without, continuous or stepwise addition of monounsaturated comonomers, branching monomers or independently a combination thereof.
10. The copolymer or process of any of the preceding embodiments wherein the process is a suspension polymerization process or, alternatively, an emulsion polymerization process, preferably a suspension process.
11. The copolymer or process of any of the preceding embodiments wherein the process is a suspension polymerization with continuous addition of branching monomer when branching monomer contains a preferentially incorporating monomer functionality, that is a branching monomer that interpolymerizes with vinylidene chloride preferentially to the monounsaturated comonomers used, preferably the branching monomer is selected from 1,6 hexanediol dimethacrylate, divinyl benzene or a combination thereof.
12. The copolymer or process of any of the preceding embodiments wherein the process is a suspension polymerization with batchwise addition of the branching monomer at the beginning of the polymerization where the branching monomer contains a monomer functionality that does not incorporate preferentially as compared to the monounsaturated monomers, preferably the branching monomer includes or is 1,6 hexanediol diacrylate.
13. A process comprising steps of (a) and at least three of steps b) through (i) of: (a) supplying a composition comprising at least one vinylidene chloride copolymer of any of the preceding embodiments, (b) extruding the composition into a tube form, (c) quenching the extruded tube, (d) collapsing the tube into a tape form, (e) reheating the collapsed tape in a warm tank, (f) sizing the tube to attain a desired width of the collapsed tape using a volume of fluid held inside the extruded tube, (g) forming a bubble of the composition, (h) collapsing the film bubble, and (i) winding the resulting film onto at least one roll.
14. A process of making sausage casings comprising steps of (a) folding a strip of film comprising the copolymer of any of the preceding embodiments, (b) sealing to form a side seam, (c) filling the resulting tube, and (d) cutting and closing at intervals.
15. A process comprising steps of (a) supplying a composition comprising at least one copolymer of any of the preceding embodiments to a forming apparatus, and (b) blowing the composition preferably into a bubble, preferably additionally including at least one of the steps of (c) admixing the composition with at least one additive as discussed hereinafter, (d) heating the composition sufficiently to facilitate flow through the forming apparatus, or (e) allowing a formed article to cool after forming.
16. The copolymer of any of the preceding embodiments used for any process wherein the polymer is oriented as processed, preferably blown film making, injection blow molding, blow molding, monofilament fiber formation or a combination thereof.
17. An article which is a fiber, a monofilament fiber, a molded object, a blow molded object, an, injection molded object, a film, a package, a foam, a container, a sheet, a laminate or combination thereof; preferably a film, package, sheet, sausage casing or combination thereof comprising at least one copolymer of any of the preceding embodiments.
18. A copolymer or article comprising the product of a process of any of the preceding embodiments.
19. The copolymer of any of the preceding embodiments in the form of packaging and wrapping films, optionally monolayer or multilayer films, preferably a monolayer film.

The invention claimed is:
1. A copolymer of vinylidene chloride with at least one monounsaturated comonomer and at least one branching monomer in an amount sufficient to increase molecular weight over that of a polymer prepared using the same process and same monomers in the same relative amounts except without the branching monomer but not sufficient to result in measurable crosslinking as determined by solubility in tetrahydrofuran at up to 83° C., wherein the branching monomer is present in an amount of from 3 to 30 mole percent, and which copolymer has no measurable crosslinking or gels as measured by insolubility in tetrahydrofuran (THF) at up to 83° C.
2. The copolymer of claim 1 in the form of packaging and wrapping films, optionally monolayer or multilayer films.
3. A fiber, a monofilament fiber, a molded object, a blow molded object, a film, a package, a foam, a container, a sheet, a laminate or combination thereof comprising at least one copolymer of claim 1.

4. The copolymer of claim 1 wherein the average monounsaturated comonomer content of the copolymer is from 1.1 to 25 mole %.

5. The copolymer of claim 4 wherein the monounsaturated comonomer is at least one alkyl acrylate in an amount from 1.1 to 16.6 mole %.

6. The copolymer claim 4 wherein the branching monomer is a di(meth)acrylate.

7. The copolymer of claim 4 wherein the branching monomer concentration is from 6 to 25 mole %.

8. A fiber, a monofilament fiber, a molded object, a blow molded object, a film, a package, a foam, a container, a sheet, a laminate or combination thereof comprising at least one copolymer of claim 4.

9. The copolymer claim 1 wherein the branching monomer is a di(meth)acrylate.

10. A fiber, a monofilament fiber, a molded object, a blow molded object, a film, a package, a foam, a container, a sheet, a laminate or combination thereof comprising at least one copolymer of claim 9.

11. The copolymer of claim 1 wherein the branching monomer concentration is from 6 to 25 mole %.

12. A fiber, a monofilament fiber, a molded object, a blow molded object, a film, a package, a foam, a container, a sheet, a laminate or combination thereof comprising at least one copolymer of claim 11.

13. A process for producing a tube comprising the copolymer of claim 1 comprising the steps of (a) supplying a polymer made from a composition comprising vinylidene chloride, at least one monounsaturated comonomer and at least one branching monomer, wherein the branching monomer is present in an amount of from 3 to 30 mole percent; (b) extruding the composition through an annular die into a tube form; (c) quenching the extruded tube in a cold water bath (cold tank); and (d) collapsing the tube into a tape form.

14. A process for producing the copolymer of claim 1 comprising the steps of (a) supplying vinylidene chloride monomer, (b) supplying at least one monounsaturated comonomer, (c) supplying at least one branching monomer, wherein the branching monomer is present in an amount of from 3 to 30 mole percent; and (d) exposing the resulting combination to conditions that result in polymerization into a copolymer comprising the supplied monomers.

15. The process of claim 14 wherein the process is a suspension polymerization with continuous addition of branching monomer when branching monomer contains a preferentially incorporating monomer functionality, that is, a branching monomer that interpolymerizes with vinylidene chloride preferentially to the monounsaturated comonomers used.

16. The process of claim 14 wherein the process is a suspension polymerization with batchwise addition of the branching monomer at the beginning of the polymerization where the branching monomer contains a monomer functionality that does not incorporate preferentially with vinylidene chloride as compared to the monounsaturated monomers used.

\* \* \* \* \*